March 9, 1937.  D. G. TAYLOR  2,073,326
TEMPERATURE CONTROL SYSTEM
Filed Sept. 5, 1935
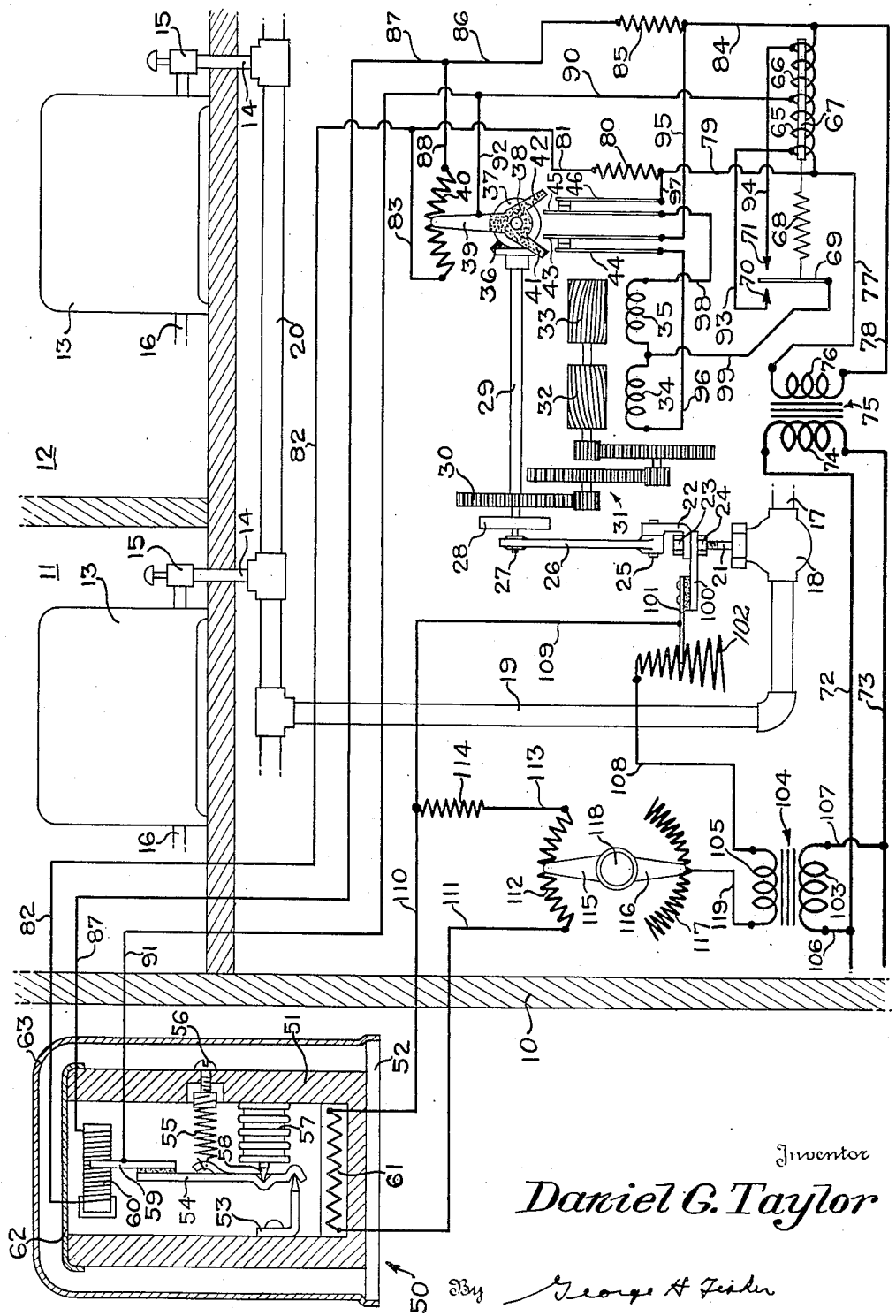
Inventor
Daniel G. Taylor
By George H Fisher
Attorney Patented Mar. 9, 1937

2,073,326

UNITED STATES PATENT OFFICE 2,073,326

TEMPERATURE CONTROL SYSTEM

Daniel G. Taylor, Minneapolis, Minn., assignor to Minneapolis-Honeywell Regulator Company, Minneapolis, Minn., a corporation of Delaware Application September 5, 1935, Serial No. 39,299

20 Claims. (Cl. 236—91)

This invention relates to temperature control systems of the type disclosed in my co-pending application, Serial No. 512,887, filed February 2, 1931.

The system disclosed in my above referred to co-pending application comprises an outdoor controller responsive to outdoor atmospheric conditions, including temperature, wind and solar radiation for controlling the temperature within the building. Heating means are provided in the building for supplying heat to the building and heating means are also provided in the outdoor controller for supplying heat to the outdoor controller. The two heating means are proportioned according to the heat losses from the building and from the outdoor controller. A thermostatic device is provided in the outdoor controller for responding to the temperature within the outdoor controller, and when this thermostatic device calls for heat both of the heating means are simultaneously energized to deliver heat to the building and to the outdoor controller. Due to the proportional relationship of the heating means with the heat losses of the building and the outdoor controller a definite temperature relation is maintained within the building and the outdoor controller so that by responding to the temperature of the outdoor controller the thermostatic device maintains a substantially constant or normal temperature within the building.

Such a system is of the "off and on" type, giving intermittent operation of the building heating means and the controller heating means. Due to the intermittent operation of the above referred to system an absolutely straight line temperature relationship cannot be accurately maintained and over-heating during mild weather is sometimes brought about. This failure to maintain an absolutely constant temperature and this over-heating is caused by the admission at intervals of a full charge of heating fluid, such as steam, to the radiators or heat exchangers within the building. This full charge of heating fluid intermittently admitted tends to cause unevenness of temperature conditions within the building and also tends to increase the radiator temperature within the building above the desired value during mild weather, thereby causing over-heating of the building.

It is, therefore, an object of this invention to provide a heating system for a building of the proportioning or modulating type whereby intermittent operation is eliminated, heat is supplied to the building at a steady rate to maintain the building temperature constant, and over-heating of the building during mild weather is prevented.

When proportioning the heat delivered to the building according to outdoor atmospheric conditions, it is desirable to proportion also the amount of heat delivered to the outdoor controller whereby a more accurate control of the building temperature is obtained. It is, therefore, another object of this invention to provide means for proportioning or modulating the amount of heat to the outdoor controller as well as to the building.

It is another object of this invention to provide a temperature control system in control of a temperature changing means for a space wherein there is provided a controller outside of the space including temperature changing means and thermostatic means responsive to the temperature of the controller and wherein the thermostatic means modulates both temperature changing means to maintain the temperature of the space at a fixed predetermined value.

Still another object of this invention is to provide a temperature control system for controlling the heating means of a building wherein the temperature control system comprises an outdoor controller subject to the same atmospheric conditions as the building, and including heating means and thermostatically operated variable resistance means, the heating means of the outdoor controller and the building being proportional to the heat losses from the outdoor controller and the building, and wherein connections between the variable resistance means and both of the heating means are provided to modulate both of the heating means in accordance with the heat losses from the controller, whereby even temperatures are maintained within the building and whereby "over-shooting" of the building temperature during mild weather is prevented.

It is a further object of this invention to provide a controller for a heating means including an electric heater and thermostatic means in control of a heating means wherein a variable impedance is operated by the heating means and connected in series with the electric heater for controlling the heating effect of the electric heater, and wherein means are associated with the electric heater for adjusting the heating effect of the electric heater but maintaining the load on the variable impedance constant, whereby the control system may be adjusted to fit each particular installation without rendering the calibration of the control system inaccurate.

Other objects and advantages will become apparent to those skilled in the art upon reference to the accompanying specification, claims and drawing, in which drawing is diagrammatically illustrated the preferred form of my invention.

My invention is shown to be applied to a building having an outside wall 10, and a plurality of spaces or rooms 11 and 12 to be heated, although the control system may be applied to any space. Located in the rooms or spaces 11 and 12 are heat exchangers or radiators 13, which receive a supply of heating fluid, such as steam, from risers 14, under the control of manually operated shut-off valves 15. The expended heating fluid may be taken from the heat exchangers or radiators 13 by means of pipes 16 and disposed of in any suitable manner. Leading from some source of heating fluid, such as a constantly energized boiler, or a central power plant, is a supply pipe 17. The flow of heating fluid from the supply pipe 17 into a pipe 19 is controlled by means of a valve 18, the pipe 19 being connected into a header 20. The risers 14 also connect into the header 20 so that when the valve 18 is moved to an open position heating fluid is delivered from the pipe 17 to the heat exchangers or radiators 13, and when the valve 18 is moved to a closed position the further supply of heating fluid to the heat exchangers or radiators 13 is prevented.

The valve 18 is adapted to be moved to either extreme closed position or extreme open position, or is adapted to be modulated or positioned at any point intermediate these extreme positions by means of a valve stem 21. A yoke 22 is secured to the valve stem 21 by means of nuts 23 and 24. The yoke 22 carries a pin 25, to which is secured one end of a pitman 26. The other end of the pitman 26 is secured to a crank pin 27, mounted on a crank disc 28, which in turn is carried by a shaft 29. The shaft 29, and consequently the valve 18, may be operated by a proportioning motor of the type shown and described in application Serial No. 673,236, filed by Lewis I. Cunningham on May 27, 1933.

For purposes of illustration in this application, I have shown this proportioning motor to comprise a gear 30 mounted on the shaft 29 and operated through a reduction gear train 31 by motor rotors 32 and 33. Associated with the motor rotors 32 and 33 are field windings 34 and 35, the arrangement being such that when the field winding 34 is energized the valve 18 is moved toward an open position, and when the field winding 35 is energized the valve 18 is moved toward a closed position. Also mounted on the shaft 29 is a bevelled gear 36 which engages a bevelled gear 37, which in turn carries an abutment member 38. The abutment member 38 is preferably made of an insulating material and carries a slider 39 adapted to slide across a balancing potentiometer coil 40. The abutment member 38 also carries fingers 41 and 42. When the abutment member 39 is moved to an extreme counter-clockwise position the finger 41 is adapted to engage contact 43 to break contact between the contact 43 and a contact 44. Likewise, upon extreme clockwise movement of the abutment member 38 the finger 42 engages a contact 45 to break contact between the contact 45 and a contact 46. Therefore, the contacts 43, 44, 45 and 46 form limit switches. Movement of the valve 18 towards an open position causes counter-clockwise movement of the abutment member 38, and movement of the valve 18 towards a closed position causes clockwise movement of the abutment member 38.

Located outside of the building, so as to respond to the same atmospheric conditions as the building, including temperature, wind and solar radiation, is an outdoor controller generally designated at 50. The outdoor controller 50 is shown to comprise a metallic block 51 mounted on a suitable base 52. The block 51 is hollowed out and has secured therein a fulcrum 53. Pivotally mounted on this fulcrum 53 is a lever 54 which is moved in a clockwise direction about the fulcrum 53 by means of an adjustable tension spring 55. The tension spring 55 may be suitably adjusted by manual manipulation of the adjusting screw 56. A bellows 57, which may contain a volatile fluid, is located in the block 51 and carries a plunger 58 which engages the lever 54 to move the lever 54 in a counter-clockwise direction about the fulcrum 53 upon an increase in temperature affecting the bellows 57. A slider 59 is suitably secured to and insulated from the lever 54 so that upon an increase in block temperature affecting the bellows 57 the slider 59 is moved to the left with respect to a potentiometer coil 60 also mounted in the block 51. Upon a decrease in block temperature the slider 59 is moved toward the right with respect to the potentiometer coil 60. The block 51 is cooled by outside atmospheric conditions, the rate of cooling depending upon outside temperatures, wind and solar radiation, and is heated by means of a heating means which may take the form of an electric heater 61. The cover 62 encloses the hollowed out portion of the block 51 so that the thermostatic bellows 57 will not be directly affected by outside atmospheric conditions but will respond directly to the temperature of the block 51. All of the above related parts comprising the outdoor controller 50 may be enclosed within a suitable casing 63 to prevent destruction of the same by the elements.

Oppositely acting coils are designated at 65 and 66, these coils controlling an armature 67 which is connected by means of a spring 68 to a pivoted switch arm 69. The pivoted switch arm 69 co-acts with spaced contacts 70 and 71. When the coil 65 is energized more than the coil 66 the switch arm 69 is moved into engagement with the contact 70, and when the coil 66 is energized more than the coil 65 the switch arm 69 is moved into engagement with the contact 71. When the coils 65 and 66 are equally energized the switch arm 69 assumes a position midway between the contacts 70 and 71, as shown in the drawing.

Leading from some source of power, not shown, are line wires 72 and 73. A primary 74 of a step-down transformer 75, having a secondary 76, is connected across the line wires 72 and 73. One end of the secondary 76 is connected by a wire 77 to one end of the coil 65, and likewise the other end of the secondary 76 is connected by a wire 78 to one end of the coil 66. The adjacent ends of the coils 65 and 66 are connected together. The outer end of the coil 65 is connected by a wire 79, a protective resistance 80 and wires 81 and 82 to the left hand end of the potentiometer coil 60. Likewise, the outer end of the coil 66 is connected by a wire 84, a protective resistance 85, and wires 86 and 87 to the right hand end of the potentiometer coil 60. The junction of wires 81 and 82 is connected by a wire 83 to the left hand end of the balancing potentiometer coil 40 and the junction of wires 86 and 87 is connected by a wire 88 to the right hand end of the balancing potentiometer coil 40. The junction of coils 65 and 66 is connected by wires 90, 91 and 92 to the slider 59 associated with the potentiometer coil 60, and to the slider 39 associated with the balancing potentiometer coil 40.

From the above wiring connections it is seen that the upper end of the secondary 76 and the left hand ends of the coil 65, the potentiometer coil 60 and the balancing potentiometer coil 40 are connected together, and likewise the lower end of the secondary 76 and the right hand ends of the coil 66, the potentiometer coil 60 and the balancing potentiometer coil 40 are also connected together. The junction of coils 65 and 66 and the sliders 59 and 39 are connected together. By reason of these connections it is seen that the secondary 76, the coils 65 and 66, the potentiometer 60 and the balancing potentiometer 40 are connected in parallel.

The contact 70 is connected by a wire 93 to a small number of turns of the coil 65, and the contact 71 is connected by a wire 94 to a small number of turns of the coil 66. The junction of the wire 84 and the protective resistance 85 is connected by a wire 95 to the limit switch contact 43 and the contact 44 cooperating with the contact 43 is connected by a wire 96 to one end of the field winding 34. Likewise, the junction of wire 79 and the protective resistance 86 is connected by a wire 97 to the contact 46 of the other limit switch, and the contact 45 associated with the contact 46 is connected by a wire 98 to one end of the field winding 35. The other ends of the field windings 34 and 35 are connected together and by a wire 99 to the pivoted switch arm 69.

Upon a decrease in block temperature of the outdoor controller 50 as caused by outdoor atmospheric conditions, the slider 59 is moved to the right with respect to the potentiometer coil 60. Due to the parallel relationship outlined above, movement of the slider 59 to the right with respect to the potentiometer coil 60 shunts or short-circuits the coil 66 to decrease the energization thereof and increase the energization of the coil 65. This causes movement of the switch arm 69 into engagement with the contact 70 to complete a circuit from the secondary 76 through wires 78, 84 and 95, contacts 43 and 44, wire 96, field winding 34, wire 99, switch arm 69, contact 70, wire 93, a small number of turns of the coil 65 and wire 77 back to the secondary 76. Completion of this circuit causes energization of the field winding 34 to move the valve 18 toward an open position to supply more heat to the building.

Movement of the valve 18 toward an open position causes left hand movement of the slider 39 with respect to the balancing potentiometer coil 40, which left hand movement causes short-circuiting of the coil 65 to decrease the energization thereof and increase the energization of the coil 66, it being remembered that the coil 65 was energized more than the coil 66 by reason of the right hand movement of the slider 59 with respect to the potentiometer coil 60. When the slider 39 has moved sufficiently far to the left to re-balance the coils 65 and 66, the switch arm 69 is moved out of engagement with the contact 70 to the mid position shown in the drawing. This causes de-energization of the field winding 34 to stop further opening movement of the valve 18 and to prevent a further increase in the rate of application of heat to the building.

Upon an increase in block temperature as caused by operation of the heater 61, the slider 59 is moved to the left with respect to the coil 60 and due to the parallel relationship set out above this causes short-circuiting or shunting of the coil 65 to decrease the energization thereof and increase the energization of the coil 66. This unbalanced relationship of the coils 65 and 66 causes movement of the switch arm 69 into engagement with the contact 71 to complete a circuit from the secondary 76 through wires 77, 79 and 97, contacts 46 and 45, wire 98, field winding 35, wire 99, switch arm 69, contact 71, wire 94, a small number of turns of the coil 66, and wire 78, back to the secondary 76. This causes energization of the field winding 35 to move the valve 18 towards a closed position, to move the slider 39 to the right with respect to the balancing potentiometer coil 40, and to decrease the rate of application of heat to the building.

Movement of the slider 39 to the right with respect to the balancing potentiometer coil 40 causes short-circuiting of the coil 66 to decrease the energization thereof and increase the energization of the coil 65, it being remembered that the coil 66 was energized more than the coil 65 by movement of the slider 59 to the left with respect to the potentiometer coil 60. When the slider 39 has moved sufficiently far to the right to re-balance the coils 65 and 66, the switch arm 69 is moved out of engagement with the contact 71 to the mid-position as shown in the drawing. This causes de-energization of the field winding 35 which prevents further movement of the valve 18 towards a closed position to prevent a further decrease in the rate of application of heat to the building.

It will be noted that the circuits through the field windings 34 and 35 pass through a small number of turns of the coils 65 and 66. This tends to slightly increase the energization of the coils 65 or 66 to forcefully hold the switch arm 69 into engagement with the contacts 70 or 71, whereby relay chatter is effectively prevented.

From the above it is seen that I have provided means whereby the valve 18 is modulated between an open and a closed position in accordance with the position of the slider 59 with respect to the potentiometer coil 60, whereby a modulation and not an intermittent opening and closing of the valve 18 is afforded in accordance with the temperature of the block 51.

Also mounted between the nuts 23 and 24 on the valve stem 21 is a bar 100 which may operate a variable impedance, and is shown herein to operate a slider 101, the slider being suitably insulated from the bar. The slider 101 is adapted to slide across a non-linear variable resistance coil 102. A primary 103 of a step-down transformer 104, having a secondary 105 is connected across the line wires 72 and 73 by wires 106 and 107, respectively. One end of the secondary 105 is connected by a wire 108 to the large end of the non-linear variable resistance coil 102. The slider 101 associated with the variable resistance coil 102 is connected by wires 109 and 110 to one end of the heater 61 of the outdoor controller 50. The other end of the heater 61 is connected by a wire 111 to one end of an impedance in the form of a resistance coil 112. The other end of the resistance coil 112 is connected by a wire 113 and a fixed resistance or impedance 114 to the junction of wires 109 and 110. Cooperating with the resistance coil 112 is a slider 115 and electrically connected to the slider 115 is a slider 116 which is adapted to cooperate with a non-linear impedance or resistance coil 117 which may have enlarged extremities. The sliders 115 and 116 may be moved simultaneously by means of a manually operated knob 118. The other end of the secondary 105 is connected by a wire 119 to a center tap on the non-linear resistance 117.

Valve 18 is so arranged that equal movements of the valve 18 toward an open position increases in equal increments the rate of application of heat to the spaces or rooms 11 and 12. In order to maintain a proportional relationship between the heat imputs to the building and to the outdoor controller 50 in accordance with the heat losses from the building and the controller, which is necessary for the satisfactory operation of the control system, equal increments of heat must be added to the outdoor controller 50 upon the addition of equal increments of heat to the building. It is known that the amount of heat given off by a resistance type heater or the watts supplied thereto does not vary directly with the current flow therethrough but varies as the square of the current flow. Therefore, in order to add these equal increments of heat to the outdoor controller 50, the current flow through heater 61 must be increased by decreasing increments as distinguished from equal increments. The resistance of the non-linear variable resistance 102 is decreased by decreasing increments as the valve 18 is moved toward an open position by equal increments of motion. This decreasing of the resistance of the variable resistance by decreasing increments increases the current flow through the heater 61 by decreasing increments to increase the wattage and consequently the heat given off by the heater 61 by equal increments, thus giving the desired control action. Therefore, with the variable resistance 102 properly designed, movement of the valve stem 21 upwardly will cause the application of proportionate amounts of heat to the outdoor controller and to the building, and likewise downward movement of the valve stem 21 will cause proportionate decreases in the amount of heat delivered to the building and to the outdoor controller. Therefore, when the temperature of the block 51 of the outdoor controller 50 is decreased by the action of the outdoor atmospheric conditions, the amount of heat delivered to the block and to the building is proportionately increased, and likewise when the temperature of the block 51 increases due to an increase in outdoor atmospheric conditions the amount of heat delivered to the building and to the outdoor controller is proportionately decreased. In this manner the heater 61 and the valve 18 are modulated to maintain the temperature within the block 51 and within the building constant, which cannot be absolutely obtained by the intermittent operation of my above referred to co-pending application.

Since the control system of this invention is of the proportioning or modulating type and not of the intermittent type, the intermittent admission of full charges of heating fluid to the radiators or heat exchangers is prevented and the correct amount of heating fluid is at all times delivered thereto. This proves extremely beneficial for mild weather operation since the admission of full charges of heating fluid would necessarily cause over-heating of the building during mild weather.

For purposes of illustration it is assumed that one watt of electrical energy supplied to the outdoor controller 50 maintains the temperature thereof substantially 10 degrees above ambient. Therefore, 10 watts maintains the outdoor controller 100 degrees above ambient so that if the outdoor temperature is 30° below zero, the outdoor controller 50 is maintained at substantially 70°. Assume that the outdoor controller 50 is applied to a building having a design temperature of 30° below zero, that is when the outdoor temperature is 30° below zero, the valve 18 must be maintained wide open to maintain the building temperature at 70°. It follows then that when the outdoor temperature is minus 30 degrees, 10 watts of electrical energy is being supplied to the outdoor controller 50 and the valve 18 is wide open to maintain the temperature of the outdoor controller 50 and the building at substantially 70°. As the outdoor temperature increases, the watts or heat supplied to the outdoor 50 and the amount of heat delivered to the building are decreased in direct proportion to increases in outside temperature until such time as the outdoor temperature increases to 70° wherein the valve 18 is closed and the supply of electrical energy to the outdoor controller 50 is shut off. As illustrated, for each 10 degrees rise in outdoor temperature the wattage of the outdoor controller is decreased by one watt and the valve 18 is moved one-tenth of its total stroke towards a closed position. In order to supply proportionate amounts of heat to the outdoor controller 50 and the building in accordance with outdoor temperatures, the variable resistance 102 must be of the non-linear type as pointed out above and it must be designed to control accurately the maximum number of watts to be supplied to the controller 50.

Assume that the outdoor controller is now applied to a building having a design temperature of zero degrees whereupon the valve 18 must be maintained wide open to maintain the temperature of the building at 70° when the outdoor temperature is zero degrees. Only 7 watts need be applied to the outdoor controller to maintain the temperature thereof at 70° when the outdoor temperature is zero. Under these conditions when the outdoor temperature is zero, the valve 18 is maintained wide open and 7 watts of electrical energy are being delivered to the outdoor controller 50. If a resistance were placed in series with the variable resistance 102 and the heater 61 of the outdoor controller 50 to decrease the watts to the outdoor controller from 10 to 7 watts, an accurate control would not be obtained. As the valve 18 is moved towards a closed position by equal increments, the wattage to the outdoor controller 50 would not be decreased by equal increments and, therefore, the proportional relationship would not be maintained. This defective mode of operation is caused by increasing the number of ohms of resistance or the load in series with the variable resistance 102. If, however, the number of ohms of resistance or the load in series with the resistance 102 is maintained constant and if the current flow through the heater 61 is adjusted in some other manner to maintain the desired wattage, the watts of the outdoor controller 50 may be caused to decrease in direct proportion to the closing of the valve 18, even though the same variable resistance 102 and the heater 61 be used. This is accomplished by placing the fixed impedance or resistance 114 in parallel with the heater 61, and by means of the slider 115 and the associated resistance coil 112 the distribution of current through the heater 61 and through the fixed resistance or impedance 114 may be varied. Movement of the slider 115 toward the right with respect to the resistance coil 112 increases the current flow through the fixed resistance 114 and decreases the current flow through the heater 61 to decrease the heating effect of the heater 61 and in a like manner movement of the slider 115 toward the left increases the heating effect of the heater 61. Such a construction, therefore, causes varying of the heating effect of the heater 61 and maintains the load on or the resistance in series with the non-linear variable resistance 102 almost constant and under certain circumstances such a construction may be sufficiently accurate to cause adequate operation of the temperature control system.

In order to maintain the load on or the resistance in series with the resistance coil 102 absolutely constant to maintain an extremely accurate control of the temperature control system, I have provided the slider 116 which cooperates with the non-linear variable resistance 117 so that movement of the slider 116 away from the center tap of the resistance coil 117 causes increasing increments of resistance or impedance to be placed in series with the above parallel circuits. The size and shape of this variable resistance 117 may be calculated from the well-known reciprocal formula relating to adding resistances in parallel and a proper design of this variable resistance 117 will maintain the total impedance or resistance in series with the non-linear resistance 102 absolutely constant.

In addition to providing a modulating control of a heating system utilizing an outdoor controller having a heater, I have provided a means whereby the heating effect of the heater of the outdoor controller may be accurately adjusted without rendering the system out of calibration.

Although I have shown and described one form of my invention, other forms thereof may become apparent to those skilled in the art, and therefore this invention is to be limited only by the scope of the appended claims and the prior art.

I claim as my invention:

1. In a temperature control system of the class described, the combination of temperature changing means for a space, a controller outside of the space and including temperature changing means and thermostatic means responsive to the temperature of the controller, the thermostatic means modulating both temperature changing means to maintain the temperatures of the controller and the space at fixed predetermined values.

2. In a heating system of the class described, the combination of heating means for a space, a controller outside of the space and including heating means and thermostatic means responsive to the temperature of the controller, the thermostatic means modulating both heating means in accordance with the heat losses from the controller and the space whereby constant temperatures are maintained in the controller and the space.

3. In a temperature control system, the combination of heating means for a building, an outdoor controller subject to the same atmospheric conditions as the building, said outdoor controller including heating means and thermostatic means, the heating means of the outdoor controller and the building being proportioned to the heat losses from the building and the outdoor controller, and the thermostatic means modulating both of said heating means in accordance to the heat losses from the controller to maintain the temperature in the controller and the building constant.

4. In a temperature control system, the combination of heating means for a building, an outdoor controller subject to the same atmospheric conditions as the building and including heating means and thermostatic means, the thermostatic means modulating both of said heating means in accordance with the heat losses from said controller, and means for adjusting at least one of the heating means to maintain the heat delivered to the building and to the outdoor controller proportional to the heat losses from the building and the outdoor controller.

5. In a temperature control system for a space, the combination of temperature changing means for the space, a controller outside of said space and including temperature changing means and thermostatically operated variable resistance means, and connections between said variable resistance means and both of said temperature changing means to modulate said temperature changing means in accordance with the temperature of said controller.

6. In a temperature control system, the combination of heating means for a building, an outdoor controller subject to the same atmospheric conditions as the building, said outdoor controller including heating means and thermostatically operated variable resistance means, the heating means of the outdoor controller and the building being proportional to the heat losses from the outdoor controller and building and connections between the variable resistance means and said heating means to modulate both of said heating means in accordance with the heat losses from the controller.

7. In a temperature control system, the combination of temperature changing means for a space, a controller outside of said space and including temperature changing means and modulating control means responsive to the temperature of the controller, and motor means positioned by said modulating control means for controlling both of said temperature changing means whereby the temperature changing means are modulated to maintain constant temperatures in the controller and space.

8. In a temperature control system, the combination of heating means for a building, an outdoor controller subject to the same atmospheric conditions as the building and including heating means and modulating control means responsive to the temperature of the outdoor controller, the heating means of the building and the outdoor controller being proportional to the heat losses from the building and the outdoor controller, motor means positioned by said modulating control means for controlling both of said temperature changing means whereby said heating means are modulated to vary the rate of application of heat to the building and the outdoor controller.

9. In a temperature control system for a space, the combination of temperature changing means for the space, a controller outside of the space and including temperature changing means and thermostatic means, and connections and mechanisms between said thermostatic means and said temperature changing means for controlling the temperature changing means in response to controller temperatures, the arrangement being such that the space temperature changing means is modulated to adjust the temperature changing effect of the space temperature changing means.

10. In a temperature control system, the combination of heating means for a building, a controller subject to the same atmospheric conditions as the building and including heating means and thermostatic means, and connections and mechanisms between the thermostatic means and the heating means whereby both of the heating means are controlled by said thermostatic means, the arrangement being such that the building heating means is modulated to vary the rate of application of heat to the building.

11. In a temperature control system, the combination of heating means for a building, a controller subject to the same atmospheric conditions as the building and including heating means and thermostatic means, the controller heating means and the building heating means being related to the heat losses from the controller and the building, and connections and mechanisms between the thermostatic means and both of the heating means whereby the heating means are controlled by the thermostatic means, the arrangement being such that the building heating means is modulated to vary the rate of application of heat to the building in accordance with the heat losses from the building as determined by outside atmospheric conditions.

12. In a temperature control system, the combination of temperature changing means for a space, a controller having temperature changing means and thermostatic means, a motor controlling the operation of said building temperature changing means and controlled by said thermostatic means to modulate said temperature changing means, a control device also controlled by said motor for modulating the controller temperature changing means whereby the temperature changing effect of both of said temperature changing means is varied.

13. In a temperature control system, the combination of temperature changing means for a space, a controller having temperature changing means and thermostatic means, a motor controlling the operation of said building temperature changing means and controlled by said thermostatic means to modulate said temperature changing means, a control device also controlled by said motor for modulating the controller temperature changing means whereby the temperature changing effect of both of said temperature changing means is varied, and means for adjusting the temperature changing effect of one of said temperature changing means with respect to the other.

14. In a temperature control system, the combination of heating means for a building, a controller subject to the same atmospheric conditions as the building, and including heating means and thermostatic means, motor means modulating the operation of said building heating means under the control of said thermostatic means, and control means also controlled by said motor means for modulating said controller heating means, whereby the rate of application of heat to the building and to the controller is varied.

15. In a temperature control system, the combination of heating means for a building, a controller subject to the same atmospheric conditions as the building and including heating means and thermostatic means, motor means modulating the operation of said building heating means under the control of said thermostatic means, control means also controlled by said motor means for modulating said controller heating means, whereby the rate of application of heat to the building and to the controller is varied, and means associated with one of said heating means whereby the rate of application of heat by that heating means may be varied to maintain the amounts of heat delivered to the controller and the building proportional to the heat losses from the same.

16. In a temperature control system, the combination of heating means for a building, a controller subject to the same atmospheric conditions as the building and including electric heating means and thermostatically operated variable resistance control means, motor means positioned by said thermostatically operated variable resistance control means and in control of said building heating means whereby the building heating means is modulated, a variable resistance positioned by said motor means and associated with said electric heating means whereby said electric heating means is modulated, and means for adjusting said electric heating means to maintain the heat imputs to said controller and said building related to the heat losses from the controller and the building.

17. In a temperature control system, the combination of heating means for a building, a controller subject to the same atmospheric conditions as the building and including electric heating means and thermostatically operated variable resistance control means, motor means positioned by said thermostatically operated variable resistance control means, and in control of said building heating means whereby the building heating means is modulated, a variable resistance positioned by said motor means and associated with said electric heating means whereby said electric heating means is modulated, and means for adjusting said electric heating means to maintain the heat imputs to said controller and said building related to the heat losses from the controller and the building, said last mentioned means including means for maintaining the load on said variable resistance substantially constant for all adjustments.

18. In a temperature control system, the combination of a controller for a heating means including an electric heater and thermostatic means in control of the heating means, a variable impedance operated by said heating means in series with said electric heater for controlling the heating effect of said electric heater, and means associated with said electric heater for adjusting the heating effect of said electric heater but maintaining the load on said variable impedance constant.

19. In a temperature control system, the combination of a controller for a heating means including an electric heater and thermostatic means in control of the heating means, a variable impedance operated by said heating means in series with said electric heater for controlling the heating effect of said electric heater, and means associated with said electric heater for adjusting the heating effect of said electric heater but maintaining the load on said variable impedance constant, said means including impedance means in parallel with said electric heater and means for varying the distribution of current through the electric heater and the impedance means.

20. In a temperature control system, the combination of a controller for a heating means including an electric heater and thermostatic means in control of the heating means, a variable impedance operated by said heating means in series with said electric heater for controlling the heating effect of said electric heater, and means associated with said electric heater for adjusting the heating effect of said electric heater but maintaining the load on said variable impedance constant, said means including impedance means in parallel with said electric heater, means for varying the distribution of current through the electric heater and the impedance means, and means for maintaining the total impedance associated with the variable impedance constant.

DANIEL G. TAYLOR.